INVENTORS
HYUNG-DUK DAVID YOO
RICHARD LESLIE GOLDEN
BY
Morris Wiseman
ATTORNEY

United States Patent Office 3,535,366
Patented Oct. 20, 1970

3,535,366
PROCESS FOR THE PRODUCTION OF TEREPHTHALONITRILE
Hyung-Duk David Yoo, Kingsville, Tex., and Richard Leslie Golden, Oradell, N.J., assignors to Halcon International, Inc., a corporation of Delaware
Filed Nov. 24, 1967, Ser. No. 685,705
Int. Cl. B01j 1/32; C07c 121/58
U.S. Cl. 260—465
6 Claims

ABSTRACT OF THE DISCLOSURE

The invention is concerned with improvements in the catalytic fixed bed process for the production of terephthalonitrile. Variations in the usual ammoxidation feed composition to restrict the oxygen content to low values, e.g., about 5 to 10% by volume, and/or to include an inert heat carrier gas, such as methane, ethane, or carbon dioxide, are attended by a reduced reaction temperature sensitivity. The new results and advantages attributable to practice of the invention include moderation of hot spot temperature while terephthalonitrile yield is generally improved.

---

This invention relates to an improved process for the production of terephthalonitrile and particularly, to such a process utilizing a fixed bed catalyst. More particularly the invention relates to the moderation of hot spot temperature in fixed bed catalytic reactions.

Terephthalonitrile is a compound of considerable commercial interest, primarily because of its widespread use as a chemical intermediate in the production of man-made fibers. An outstanding example is the use of terephthalonitrile in the manufacture of bis(2-hydroxyethyl)terephthalate, a monomeric material used in the manufacture of fiber forming polyester resins.

Terephthalonitrile is produced commercially by the gas phase ammoxidation of p-xylene, illustrative processes being disclosed in U.S. Pats. 2,499,055; 2,838,558; 2,846,-462; 2,987,538, British Pat. 803,901 and German Pat. 954,241. The reaction may be carried out by passing a mixture of p-xylene, ammonia and oxygen over a catalyst at a temperature in the range of 400 to 475° C. Where the catalyst is contained in a fixed bed reactor, heated by a salt bath the exothermic nature of the terephthalonitrile reaction often gives rise to the occurrence of a hot spot, i.e., a point along the reactor length where the temperature becomes unduly high for the reaction desired. This phenomenon is highly undesirable since it poses significant difficulties in controlling and in reproducing results.

In general, the occurrence of hot spots has presented significant problems and various techniques for dealing with these problems have been suggested by the prior art. Illustrative thereof are suggested changes in the construction or arrangement of equipment including the provision of separate cooling zones with different temperatures, the reduction of reactor diameter in the vicinity of a hot spot, the coating of local sections of a reactor to change the overall heat transfer coefficient, and the variation of catalyst activity along the length of the reactor. While these suggestions appear to have prima facie support as being based on meritorious engineering principles, and indeed effect to some extent the desired moderation of hot spot temperature, nevertheless, attendant disadvantages, such as decreased product yield and increased fixed and operating costs have offset any benefits obtained.

Other suggestions for moderating hot spot temperature have been offered by the prior art but have been lacking in evidence of reliability. Since hot spot temperature is a phenomenon that develops from the local limitation of heat removal ability, it follows that both the energy balance and the material balance together with the reaction kinetics play important roles. It might, therefore, be thought that a theoretical treatment of the subject would lend itself to an accurate prediction of the necessary conditions to overcome the disadvantages of the prior art. Unfortunately, large gaps in experimental kinetic data necessitate assumptions which are radical and over-simplifying and do not provide a kinetic model of the sophistication required for calculations of any degree of reliability.

Accordingly, a principal object of the present invention is to provide an improved process for the production of terephthalonitrile which is unattended by the aforementioned disadvantages of the prior art.

Another object of the invention is to provide a process for the production of terephthalonitrile characterized by reduced reaction temperature sensitivity.

Still another object of the invention is to provide a process for the production of terephthalonitrile wherein hot spot temperature is significantly moderated and which is generally attended by improved yield.

Other objects of the invention will in part be obvious and in part appear hereinafter in the following description of the invention and the drawings herein.

Figure 1:
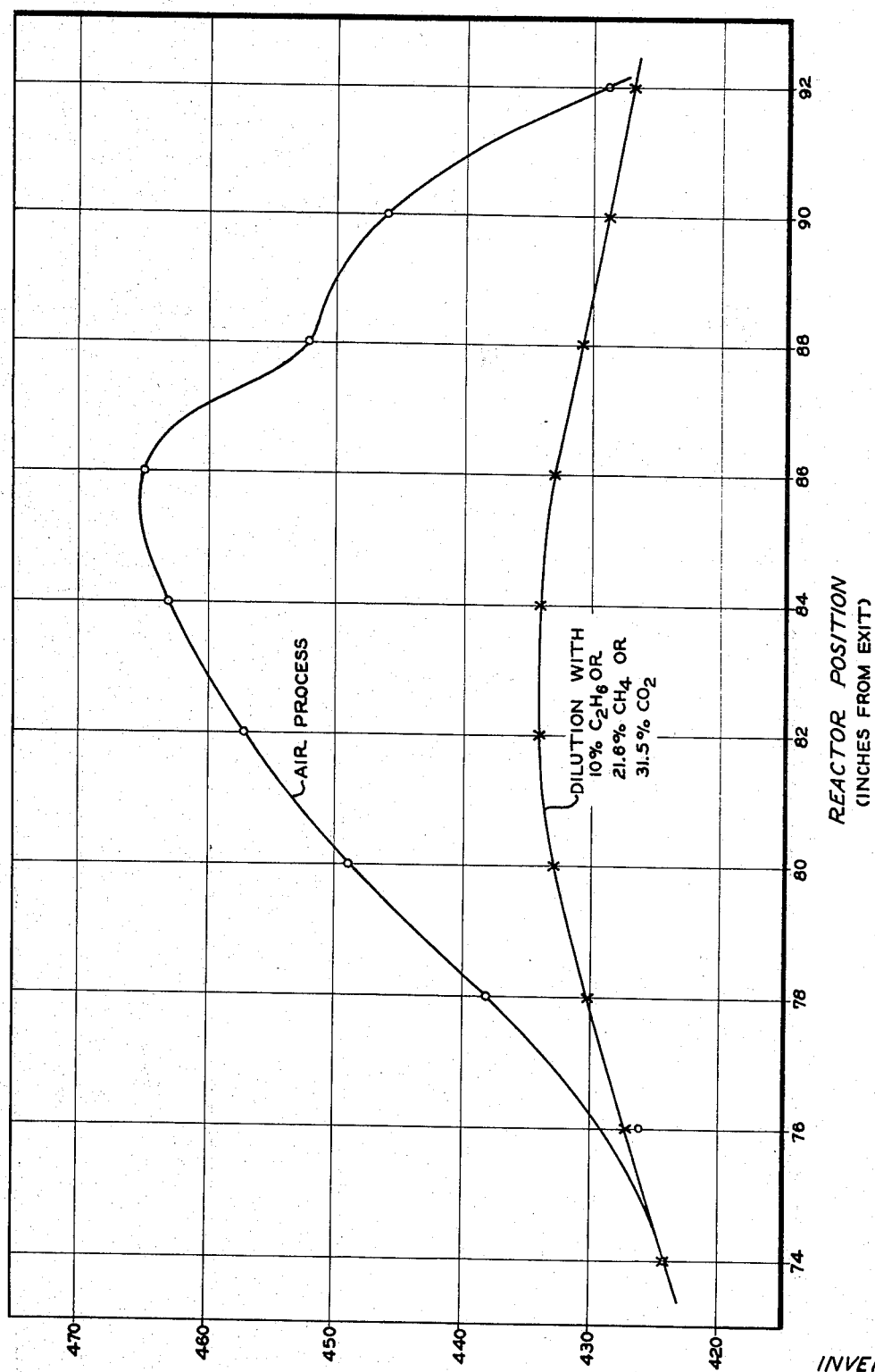
FIG. 1 depicts plots of conversion and selectivity of terephthalonitrile as functions of salt bath temperature for the inventive process and compares against yield of terephthalonitrile for the air process.

The present invention is directed to an improved process for the production of terephthalonitrile wherein feed materials are reacted over fixed bed catalysts and includes an improvement to a process substantially embodying the conditions and features described in copending U.S. patent application Ser. No. 390,206 filed Aug. 17, 1964 now abandoned.

In its broadest application the invention contemplates variation of the reactor feedstock composition to effect the desired hot spot temperature moderation. The variation is limited in one embodiment to a low oxygen containing feed. The oxygen content should be effective to produce the desired hot spot moderation while maintaining an economical yield. Generally, the oxygen content should fall in the range of 5 to 10% by volume and preferably 7 to 8% by volume.

In another embodiment the variation comprises the dilution of the feed with an inert gas characterized by a heat capacity higher than that of nitrogen, the resultant substantial diluent of the prior art air process. Good candidates for this heat carrier gas are methane, ethane and carbon dioxide. The heat carrier gas need not be limited to a single compound but may comprise mixtures, the essential criteria being a lack of reactivity under the process conditions to which it is subjected and a capacity for the absorption of a greater quantity of heat per unit volume than exhibited by nitrogen.

Application of the inventive concept to a fixed bed terephthalonitrile reactor is attended by significant moderation of hot spot temperature. In addition the resulting improved temperature profiles indicate that the difficulties occasioned by the prior art in controlling the terephthalonitrile reaction and in reproducing results may be avoided entirely or, at the very least significantly minimized. Concomitantly and unexpectedly, the improved process is attended by terephthalonitrile yields which equal or even exceed that obtained by prior art techniques.

In general, the dilution embodiment of the invention is practiced by adding the heat carrier gas to the reactor feed preliminary to entering the terephthalonitrile reactor or the heat carrier gas may be added directly to the reactor. The minimum amount of heat carrier gas added should be effective to bring about a significant reduction in the hot spot temperature while the maximum quantity is dictated essentially by economic considerations, i.e. the more diluent employed the less active ingredients can be utilized, thereby reducing productivity. A suitable dilution may be regarded as from 5 to 80% by volume of the reactor feed. Preferably, the dilution is from 5 to 40% by volume.

In the course of the investigation leading to the present invention a series of test runs for the catalytic conversion of p-xylene to terephthalonitrile was conducted using a fixed bed reactor. The latter comprised a 12 foot salt-jacketed, carbon steel reactor of 1 inch O.D. containing a fixed bed catalyst comprising 1.28% by weight $V_2O_5$ and 8.15% by weight $Sb_2O_3$ deposited on alumina (Alcoa tabular alumina T-71, ¼" to 8 mesh) pellets.

Initially, a temperature profile was determined for a reactor feed illustrative of the prior art "air process." The molar composition of this feed is given below:

| | Percent |
|---|---|
| p-xylene | 1.0 |
| $H_2O$ | 10.0 |
| $NH_3$ | 6.0 |
| Air | 83.0 |

The feed p-xylene employed was a practical grade of 95% purity, the balance being m-xylene and traces of other aromatics. Space velocity of the reaction mixture was 1500 hr.$^{-1}$ while salt bath temperature was 395° C. The run resulted in a p-xylene conversion of 100% while terephthalonitrile selectivity was computed as 82.5%. Tabulated data for the run appears in Table I.

TABLE I

| Bed Temp., ° C.: | Reactor position (inches) |
|---|---|
| 424 | 74 |
| 426 | 76 |
| 438 | 78 |
| 449 | 80 |
| 457 | 82 |
| 463 | 84 |
| 465 | 86 |
| 452 | 88 |
| 446 | 90 |
| 429 | 92 |

Modification of the "air process" feed by dilution with various gaseous, heat carrier components provides the following temperature profile data:

TABLE II [1]

| Bed temp. (° C.): | Reaction position (inches) |
|---|---|
| 424 | 74 |
| 427 | 76 |
| 430 | 78 |
| 433 | 80 |
| 434 | 82 |
| 434 | 84 |
| 433 | 86 |
| 431 | 88 |
| 429 | 90 |
| 427 | 92 |

[1] Data is for dilution with 10% $C_2H_6$ or 21.6% $CH_4$ or 31.5% $CO_2$.

The data of Tables I and II are plotted to provide the comparative temperature profiles of FIG. 1. Cursory examination of the profiles indicates quite clearly that dilution of the "air process" feed in the manufacture of terephthalonitrile in accordance with the invention is attended by a significant moderation of hot spot temperature.

Further investigation leading to the present invention was conducted using a reactor feed having essentially the following composition:

| | Percent |
|---|---|
| p-xylene | 1.0 |
| $CH_4$ | 20.0 |
| $H_2O$ | 5.0 |
| $NH_3$ | 6.0 |
| $O_2$ | 7.1 |
| $N_2$ | Balance |

Reaction conditions were essentially as aforementioned with the exception of variables set forth in Table III.

TABLE III

| Run No. | Salt bath temp., ° C. | Max. bed temp., ° C. | p-Xylene conversion, percent | TPN selectivity, percent | Mols $CO_2$ per 100 mols p-xylene | Mols HCN per 100 mols p-xylene |
|---|---|---|---|---|---|---|
| 1 | 420 | 442 | 78.7 | 86 | 2.92 | |
| 2 | 425 | 454 | 100 | 85 | 5.85 | |
| 3 | 428 | 463 | 100 | 83.5 | 7.73 | |
| 4 | 403 | 515 | | | | 1.71 |
| 5 | 426 | 458 | | | | 3.85 |

Figure 2:
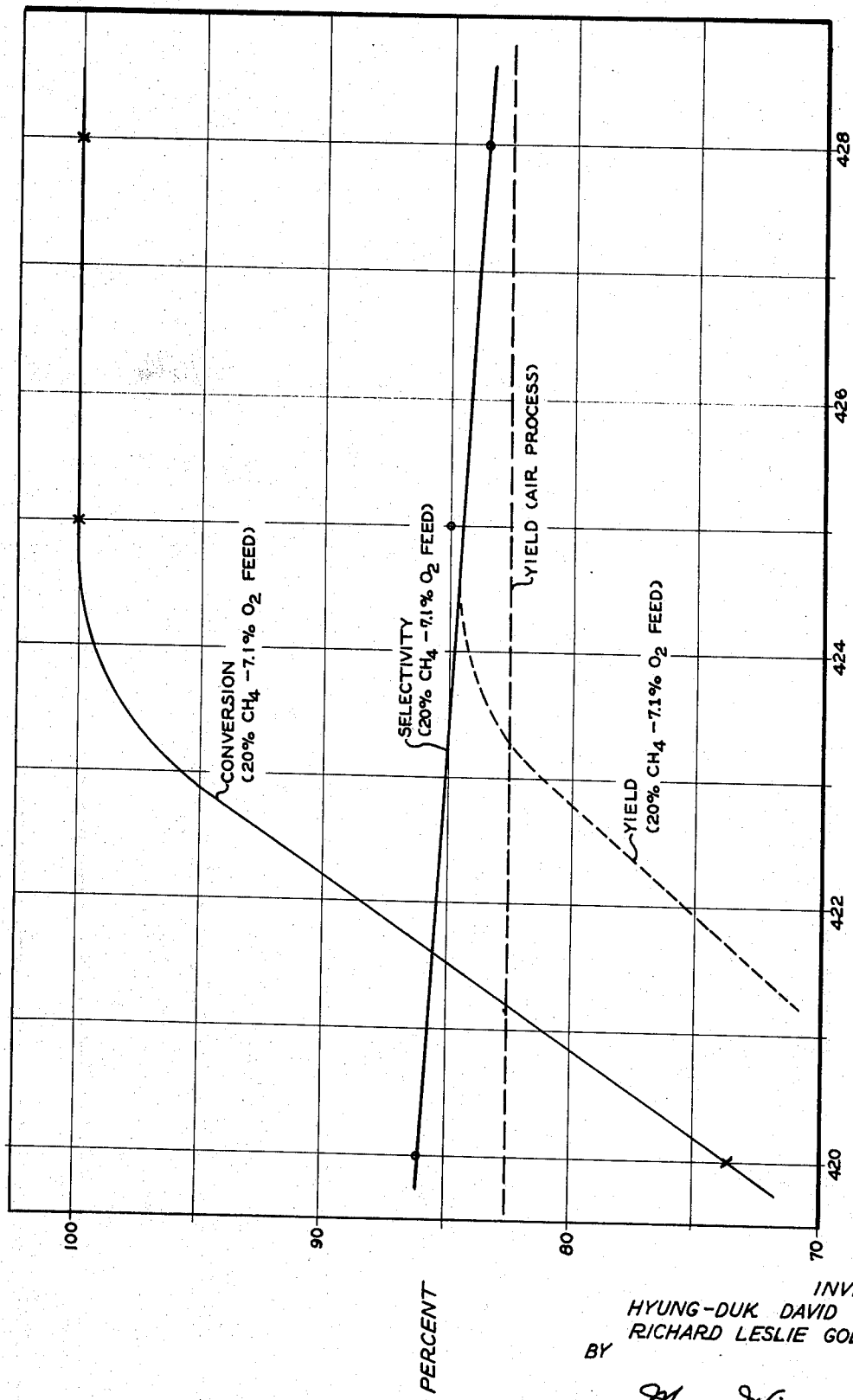
FIG. 2 depicts a plot of hydrogen cyanide in the product as a function of salt bath temperature.
Figure 3:
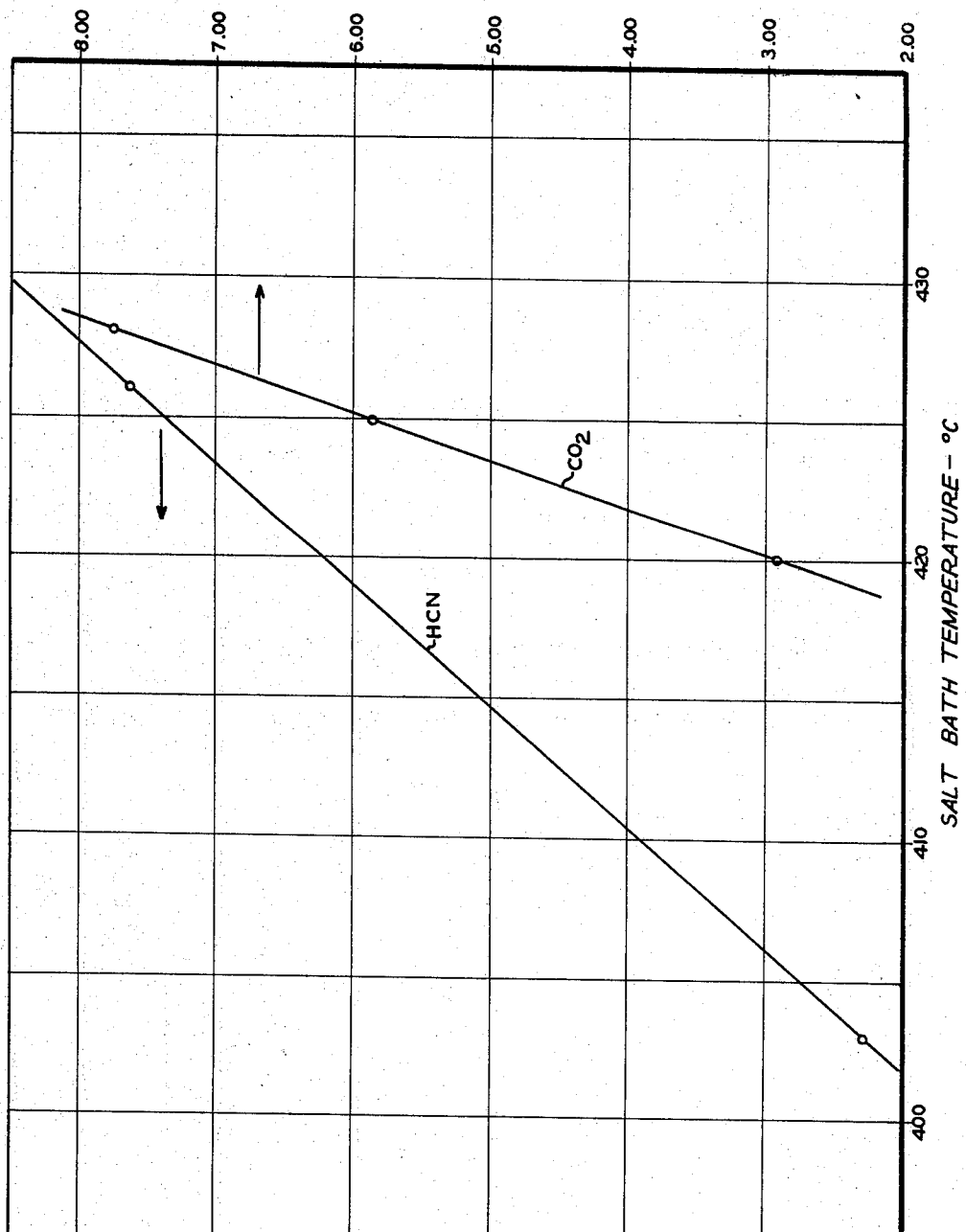
FIG. 3 depicts plots denoting reaction stability.

Examination of the foregoing data reveals that the inventive process is attended by improved selectively when compared with the prior art air process. FIG. 2 which graphically illustrates the effect of salt bath temperature, reveals that the yield of terephthalonitrile (TPN) from the inventive process increases rapidly with increasing salt bath temperature until it equals that for the air process. Thereafter, the yield continues to increase at a lower rate until the conversion becomes 100%, whereupon there is a gradual diminution approaching the yield in the air process. The diminution would appear to be attributable to the degradation of p-xylene to substances such as carbon dioxide and hydrogen cyanide. In this regard, it may be observed in FIG. 3 that the formation of carbon dioxide and hydrogen cyanide increases dramatically with increasing salt bath temperature.

Additional test runs were conducted as aforedescribed for the purpose of studying the influence of oxygen level and heat carrier gas dilution on the stability of the terephthalonitrile reaction. Data obtained therefrom is tabulated in Table IV.

TABLE IV

| Feed gas composition | Salt bath temp., ° C. | Max. bed temp., ° C. |
|---|---|---|
| 7.1% $O_2$ | 402 | 415 |
| 1.0% p-xylene | 413 | 435 |
| 5.0% $H_2O$ | 416 | 440 |
| 6.0% $NH_3$ | 417 | 443 |
| Balance $N_2$ | 418 | 441 |
| | 421 | 446 |
| | 425 | 456 |
| | 428 | 463 |
| 7.1% $O_2$ | 403 | 415 |
| 20% $CH_4$ | 420 | 442 |
| 1.0% p.xylene | 425 | 454 |
| 5.0% $H_2O$ | 426 | 458 |
| 6.0% $N_3$ | 429 | 463 |
| Balance $N_2$ | | |
| 83% air (=17.4% $O_2$) | 398 | 412 |
| 1.0% p-xylene | 403 | 430 |
| 10.0% $H_2O$ | 404 | 439 |
| 6.0% $NH_3$ | 406 | 440 |
| | 407 | 446 |
| | 408 | 450 |

Figure 4:
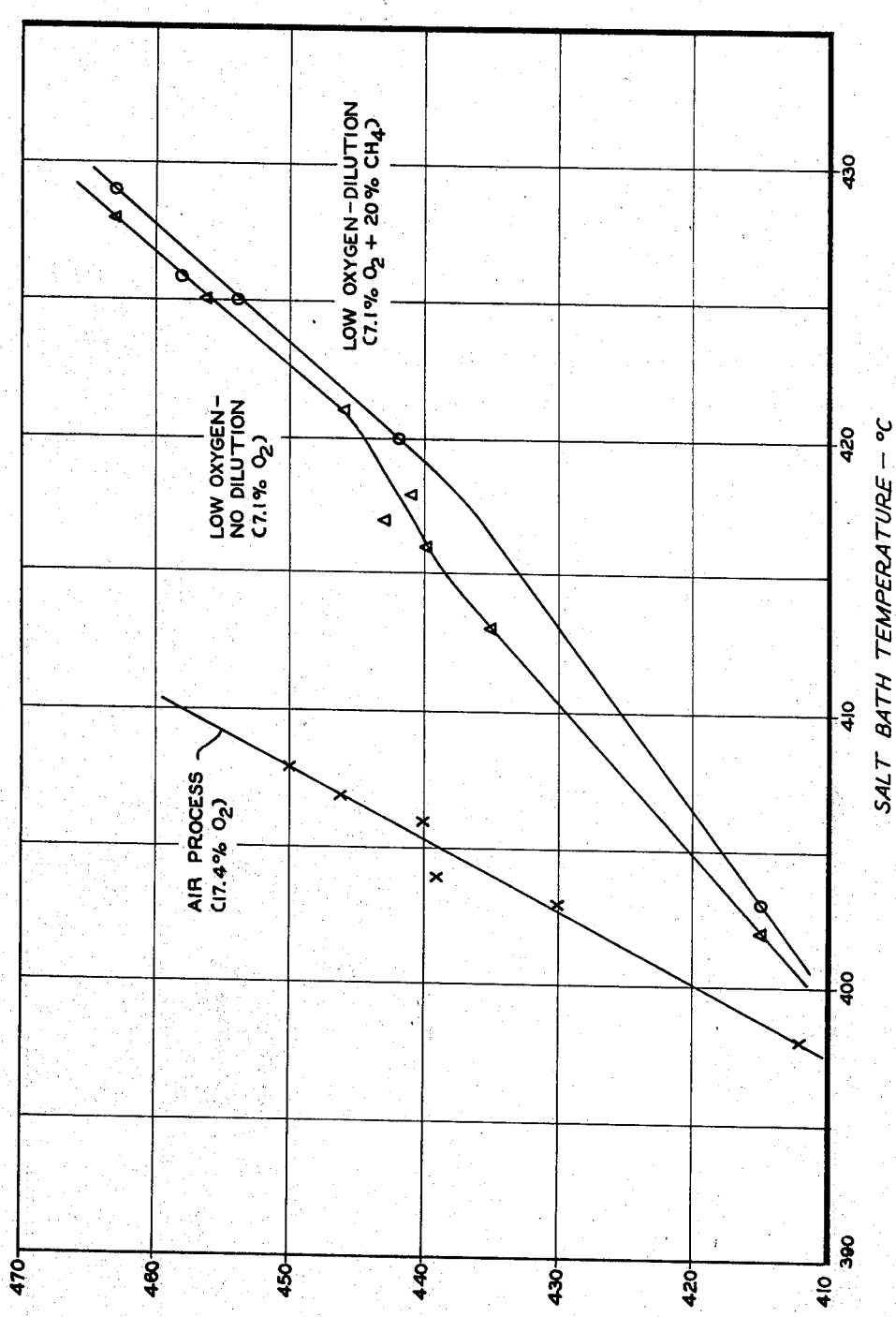

The data in Table IV is plotted in FIG. 4 to show maximum bed temperature as a function of salt bath temperature with oxygen level and heat carrier dilution as parameters. The plotted curves in FIG. 4 clearly reveal a marked decrease in slope where a low oxygen level is employed in the feed, indicating a significantly reduced reaction temperature sensitivity.

While the invention has been described with regard to the preferred embodiments, it will be understood that various changes may be made in the process of the invention and that heat carrier gases and feed gas compositions other than those specifically described herein may be utilized without departing from the spirit and scope of the invention.

We claim:
1. In a process for the production of terephthalonitrile by the vapor phase ammoxidation of p-xylene in the presence of a fixed bed catalyst, the improvement which comprises: employing as the reactor feed a gaseous mixture comprising an amount of oxygen limited to a concentration within the range of 5 to 10% by volume in conjunction with from 5 to 80% by volume of a heat carrier gas, inert under the conditions of reaction, selected from the group consisting of methane and ethane.

2. A process according to claim 1 wherein the oxygen concentration is in the range of 7 to 8% by volume.

3. A process in accordance with claim 1 wherein the heat carrier gas comprises about 20% by volume of said feed.

4. A process in accordance with claim 1 wherein the heat carrier gas is methane.

5. A process in accordance with claim 1 wherein the heat carrier gas is ethane.

6. A process in accordance with claim 1 wherein the heat carrier gas comprises from 5 to 40% by volume of the reactor feed.

References Cited

UNITED STATES PATENTS

| 2,838,558 | 6/1958 | Hadley et al. | 260—465 |
|---|---|---|---|
| 2,846,462 | 8/1958 | Hadley | 260—465 |
| 2,987,538 | 6/1961 | Gasson | 260—465 |
| 3,079,422 | 2/1963 | Dasky | 260—465 |
| 3,278,573 | 10/1966 | Kroeper et al. | 260—465 |
| 3,312,710 | 4/1967 | Sakuyama et al. | 260—465 X |
| 3,355,479 | 11/1967 | Oga et al. | 260—465 |
| 3,395,159 | 7/1968 | Levine | 260—465 X |

FOREIGN PATENTS 619,842   5/1961   Canada.

CHARLES B. PARKER, Primary Examiner

D. H. TORRENCE, Assistant Examiner

U.S. Cl. X.R.

252—461; 260—75, 618